US009792734B2

(12) United States Patent
Kara et al.

(10) Patent No.: US 9,792,734 B2
(45) Date of Patent: Oct. 17, 2017

(54) METHODS AND SOFTWARE FOR VOLUME-CENTRIC SHAPE ABSTRACTION AND SIMPLIFICATION OF A 3D DIGITAL MODEL

(71) Applicant: Carnegie Mellon University, Pittsburgh, PA (US)

(72) Inventors: Levent Burak Kara, Pittsburgh, PA (US); Mehmet Ersin Yumer, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 59 days.

(21) Appl. No.: 14/485,086

(22) Filed: Sep. 12, 2014

(65) Prior Publication Data
US 2015/0077417 A1    Mar. 19, 2015

Related U.S. Application Data

(60) Provisional application No. 61/960,242, filed on Sep. 13, 2013.

(51) Int. Cl.
G06T 19/20        (2011.01)
G06T 17/10        (2006.01)

(52) U.S. Cl.
CPC .............. G06T 19/20 (2013.01); G06T 17/10 (2013.01); *G06T 2210/36* (2013.01); *G06T 2219/2021* (2013.01)

(58) Field of Classification Search
None
See application file for complete search history.

(56) References Cited

U.S. PATENT DOCUMENTS

2005/0128211 A1*   6/2005   Berger ................... G06T 19/00
                                                                       345/582
2005/0154481 A1*   7/2005   Berger ................... G06T 19/20
                                                                       700/98

OTHER PUBLICATIONS

Attene, M., Mortara, M., Spagnuolo, M., and Falci-Dieno, B. 2008. Hierarchical convex approximation of 3D shapes for fast region selection; Eurographics Symposium on Geometry Processing 2008, in Computer Graphics Forum, vol. 27, 1323-1332.

(Continued)

*Primary Examiner* — Mark Zimmerman
*Assistant Examiner* — Nurun N Flora
(74) *Attorney, Agent, or Firm* — Downs Rachlin Martin PLLC (57) ABSTRACT

Methods of generating one or more abstractions of a three-dimensional (3D) input model by performing volumetric manipulations on one or more volumetric abstractions of the 3D input model. In some embodiments, volumetric manipulations are made to a volumetric shell abstraction of a 3D input model in a successive and iterative manner to generate an abstraction hierarchy composed of a set of volumetric abstractions having differing levels of abstraction based on containing differing amounts of geometric detail from the 3D input model. In one example of geometric manipulation, one or more fitted subvolumes corresponding to geometric detail of the 3D input model are identified based on a current level of abstraction and the 3D input model, and each fitted subvolume is added to or subtracted from the current level of abstraction to generate a next, finer level of abstraction. In some embodiments, the disclosed methods are embodied in suitable software.

14 Claims, 6 Drawing Sheets

(56) References Cited

OTHER PUBLICATIONS

Golovinskiy, A., and Funkhouser, T. 2009. Consistent segmentation of 3D models. Computers & Graphics 33, (2009), 262-269.

Huang, Q., Koltun, V., and Guibas, L. 2011. Joint shape segmentation with linear programming. In ACM Transactions on Graphics (TOG), vol. 30, 125.

Mehra, R., Zhou, Q., Long, J., Sheffer, A., Gooch, A., and Mitra, N. 2009. Abstraction of man-made shapes. In ACM Transactions on Graphics (TOG), vol. 28, ACM, 137.

Schnabel, R., Wahl, R., and Klein, R. 2007. Efficient RANSAC for point-cloud shape detection. In Computer Graphics Forum, vol. 26, No. 2, Wiley Online Library, 214-226.

Schnabel, R., Degener, P., and Klein, R. 2009. Completion and reconstruction with primitive shapes. Eurographics 2009; In Computer Graphics Forum, vol. 28, Wiley Online Library, 503-512.

Sidi, O., Van Kaick, O., Kleiman, Y., Zhang, H., and Cohen-Or, D. 2011. Unsupervised co-segmentation of a set of shapes via descriptor-space spectral clustering. ACM Transactions on Graphics (TOG) vol. 30, No. 6, Article 126. Dec. 2011.

\* cited by examiner

METHODS AND SOFTWARE FOR VOLUME-CENTRIC SHAPE ABSTRACTION AND SIMPLIFICATION OF A 3D DIGITAL MODEL

RELATED APPLICATION DATA

This application claims the benefit of priority of U.S. Provisional Patent Application Ser. No. 61/960,242, filed Sep. 13, 2013, and titled "Geometric Processing Methods, Apparatuses, And Systems For Shape Abstraction, Shape Compression, And Shape Co-Simplification," which is incorporated by reference herein in its entirety.

STATEMENT REGARDING FEDERALLY SPONSORED RESEARCH OR DEVELOPMENT

This invention was made with government support under National Science Foundation No. NSF CMMI 0846730-NSF-KARA. The government may have certain rights in this invention.

FIELD OF THE INVENTION

The present invention generally relates to the field of computer generated three-dimensional (3D) digital models. In particular, the present invention is directed to methods and software for volume-centric shape abstraction and simplification of a 3D digital model.

BACKGROUND

Industrial design of products has become ubiquitous as manufacturers strive to make their products not only highly functional but also attractive to consumers. In many industries, such as the automotive industry, designers strive to make each automobile model as visually appealing as possible, but they also try to incorporate into each model of multiple models of a particular brand visual cues that effectively identify the brand. Currently, industrial designers spend many years learning their craft, including how to implement visual branding cues. Unfortunately, few automated tools exist to assist industrial designers with analyzing and developing visual branding cues.

SUMMARY OF THE DISCLOSURE

In one implementation, the present disclosure is directed to a method of generating a finer volumetric abstraction for viewing by a human viewer, the finer volumetric abstraction corresponding to a digital three-dimensional (3D) input model. The method includes digitally acquiring a coarser volumetric abstraction corresponding to the digital 3D input model; digitally performing subvolume extraction to determine one or more subvolumes to add to or subtract from the coarser volumetric abstraction; for each subvolume of the one or more subvolumes: digitally determining, as a function of the digital 3D input model, whether to 1) add the subvolume to the coarser volumetric abstraction or 2) subtract the subvolume from the coarser volumetric abstraction; and depending on the digitally determining, either 1) digitally adding the subvolume to the coarser volumetric abstraction or 2) digitally subtracting the subvolume from the coarser volumetric abstraction in generating the finer volumetric abstraction; and outputting the finer volumetric abstraction for viewing by the human viewer.

In another implementation, the present disclosure is directed to a method of creating an abstraction hierarchy for viewing by a human viewer, the abstraction hierarchy comprising a plurality of digital volumetric abstractions of a three-dimensional (3D) input model having geometric detail. The method includes digitally generating a volumetric shell abstraction of the 3D input model; digitally generating the abstraction hierarchy by successively and iteratively digitally modifying the volumetric shell abstraction using fitted subvolumes to incrementally increase the geometric detail of the 3D input model represented in successive ones of the plurality of volumetric abstractions; and outputting the abstraction hierarchy for viewing by the human viewer.

In still another implementation, the present disclosure is directed to a machine-readable storage medium containing machine-executable instructions for performing a method of generating a finer volumetric abstraction for viewing by a human viewer, the finer volumetric abstraction corresponding to a digital three-dimensional (3D) input model. The machine-executable instructions includes a first set of machine-executable instructions for digitally acquiring a coarser volumetric abstraction corresponding to the digital 3D input model; a second set of machine-executable instructions for digitally performing subvolume extraction to determine one or more subvolumes to add to or subtract from the coarser volumetric abstraction; a third set of machine-executable instructions for, for each subvolume of the one or more subvolumes: digitally determining, as a function of the digital 3D input model, whether to 1) add the subvolume to the coarser volumetric abstraction or 2) subtract the subvolume from the coarser volumetric abstraction; and depending on the digitally determining, either 1) digitally adding the subvolume to the coarser volumetric abstraction or 2) digitally subtracting the subvolume from the coarser volumetric abstraction in generating the finer volumetric abstraction; and a fourth set of machine-executable instructions for outputting the finer volumetric abstraction for viewing by the human viewer.

In yet another implementation, the present disclosure is directed to a machine-readable storage medium containing machine-executable instructions for performing a method of creating an abstraction hierarchy for viewing by a human viewer, the abstraction hierarchy comprising a plurality of digital volumetric abstractions of a three-dimensional (3D) input model having geometric detail. The machine-executable instructions include a first set of machine-executable instructions for digitally generating a volumetric shell abstraction of the 3D input model; a second set of machine-executable instructions for digitally generating the abstraction hierarchy by successively and iteratively digitally modifying the volumetric shell abstraction using fitted subvolumes to incrementally increase the geometric detail of the 3D input model represented in successive ones of the plurality of volumetric abstractions; and a third set of machine-executable instructions for outputting the abstraction hierarchy for viewing by the human viewer.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

The present disclosure is directed to a number of methods for automatedly creating abstractions of one or more 3D input models using volumetric abstractions and volumetric manipulation techniques to modify one or more coarser abstractions into one or more finer abstractions. For the sake of this disclosure, a "3D input model" has a broad denotation and is used to denote a model, such as a digital model (e.g., computer-aided design (CAD) generated model), of virtually any 3D structure that is or can be represented in a model. Consequently, the variety of 3D input models that can be subjected to any one or more of the methods disclosed herein is vast, ranging from 3D models of manmade physical objects, such as consumer products (e.g., automobiles, appliances, tools, furniture, computers, etc.) and manmade computer-generated objects (e.g., computer-generated analogs to manmade physical object, computer-generated animation characters, etc.), to 3D models of natural objects (e.g., rock formations, plants, animals, etc.). Generally, a 3D input model is a model that includes perceived surfaces and character lines and other geometric detail that defines the subject of the model functionally, aesthetically, and/or simply geometrically. A 3D input model can be as complex or as simplistic as desired, generally as long as the characteristic details of the model's subject remain. For example, a suitable 3D input model of a car may be a CAD model that includes not only the detail of the exterior of the car, but also all of the components that make up the various systems and components of the car, such as the drivetrain, electrical system, interior details, lug nuts, etc. On the opposite end of the spectrum, a suitable 3D input model of the same car may be a 3D model that contains only the exterior of the car, along with its perceived surfaces, character lines, and other details, such as door handles, grill work, etc.

Figure 2:
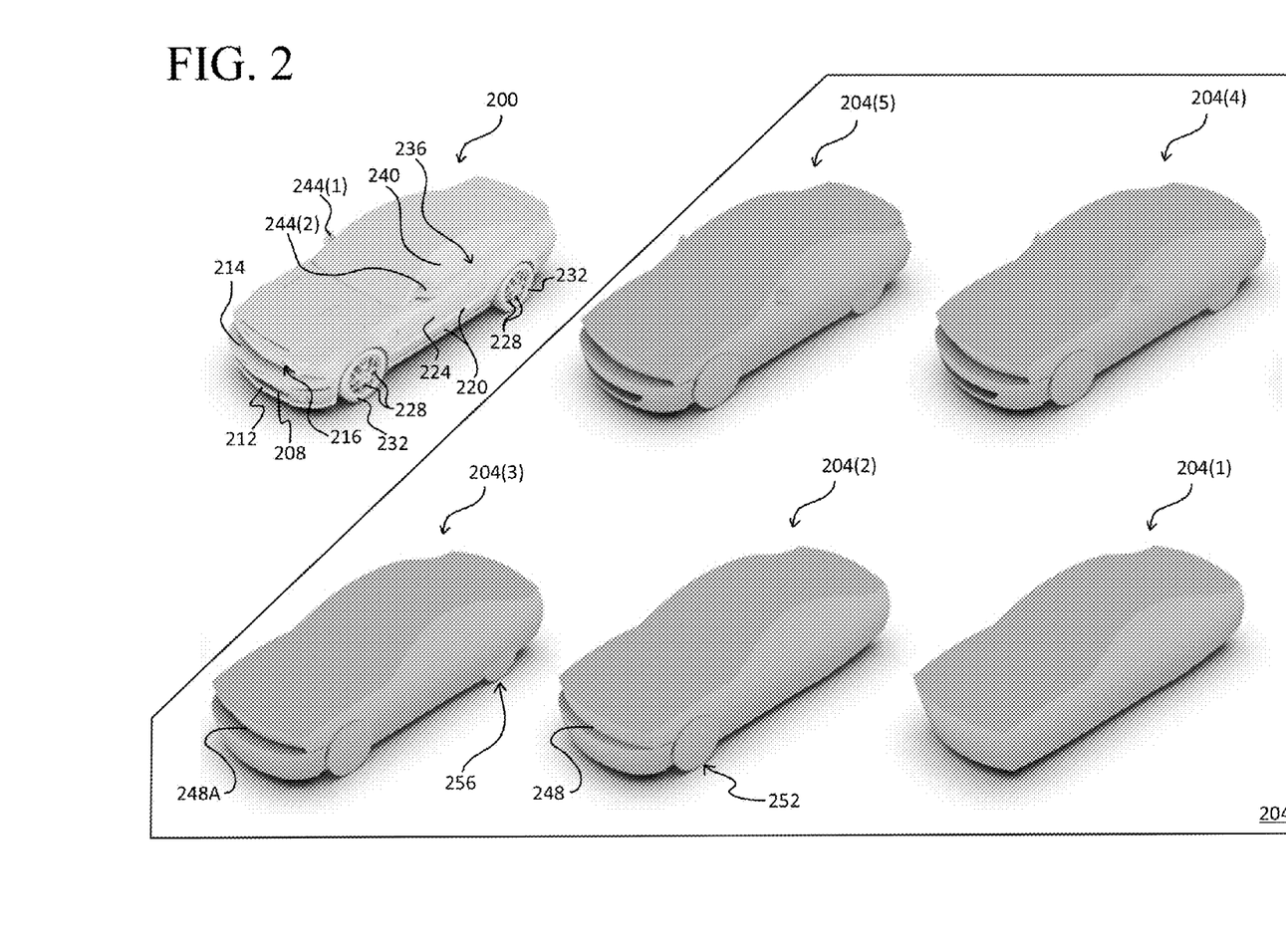
FIG. 2 illustrates an exemplary set of volumetric abstractions containing differing levels of geometric detail from the 3D input model, the set constituting an abstraction hierarchy.

As will be understood from reading this entire disclosure, either 3D model of the car of the example above can be used as a starting point, i.e., the "3D input model, for various methods disclosed herein, which generally start with a volumetric shell abstraction of the 3D input model. As used herein, the term "volumetric shell abstraction" describes a very high-level volumetric abstraction of the 3D input model that lacks virtually all detail of the input model. For example, a volumetric shell abstraction of a spoked wagon wheel (sans hub extension) from a Conestoga wagon of the 1800s will generally appear as a solid disk of uniform thickness, with the diameter of the disk corresponding to the outside diameter of the wheel and the thickness of the disk corresponding to the greatest thickness of the wheel in a direction parallel to the rotational axis of the wheel (likely the rim of the wheel). As can be readily appreciated, such a plain, basic disk lacks virtually all of the detail of the original wheel (3D input model), such as the spokes and voids between the spokes. In this connection, it is noted that the terms "coarser volumetric abstraction" and "finer volumetric abstraction" are used to distinguish between two volumetric abstractions having differing levels of abstraction (usually two abstractions of the same 3D input model), with the coarser volumetric abstraction having less detail of the original 3D model than the finer volumetric abstraction. In other words and as described below, a finer volumetric abstraction can be created from a coarser volumetric abstraction by systematically providing the coarser abstraction with additional detail using volumetric manipulation. A spectrum of coarser to finer volumetric abstractions 204(1) to 204(5) for a particular 3D input model 200 is illustrated in FIG. 2, discussed in more detail below.

As alluded to immediately above, some aspects of the present disclosure are directed to volumetric manipulations that a computing system can perform to digitally generate a finer volumetric abstraction of a 3D input model using a coarser volumetric abstraction of the same 3D input model. Performing these manipulations sequentially and iteratively using each resultant finer volumetric abstraction as the next coarser volumetric abstraction allows a computer-based volumetric abstraction system to digitally and automatedly generate an abstraction hierarchy containing a plurality of volumetric abstractions having differing levels of abstraction from very coarse to fine or very fine. Successive volumetric manipulations for creating an abstraction hierarchy typically start with an initial very coarse volumetric shell of the 3D input model and proceed with as many iterations as desired by a user or programmed into the hierarchy-generating software. As an example of the former, the hierarchy-generating software may allow a user to set a particular number of successive iterations to perform and/or may otherwise allow the user to limit the number of iterations to perform, for example, by providing a "stop" control in conjunction with a display that displays a visual representation of each volumetric abstraction the software generates. In other embodiments, the abstraction may continue automatedly until the finer volumetric abstraction reaches a predetermined level of detail, such as a level of detail that is within a certain percentage of the level of detail in the 3D input model, as measured by an appropriate measure.

In other aspects, the present disclosure is directed to "co-abstracting" multiple differing 3D input models with one another and then identifying a most-suitable abstraction level in each of the resulting abstraction hierarchies. In one example, the most-suitable level of abstraction in each hierarchy is digitally determined by minimizing a joint entropy computed from inter- and intra-model geometric relationships. The foregoing and other aspects of the present disclosure are addressed below in detail.

Figure 1:
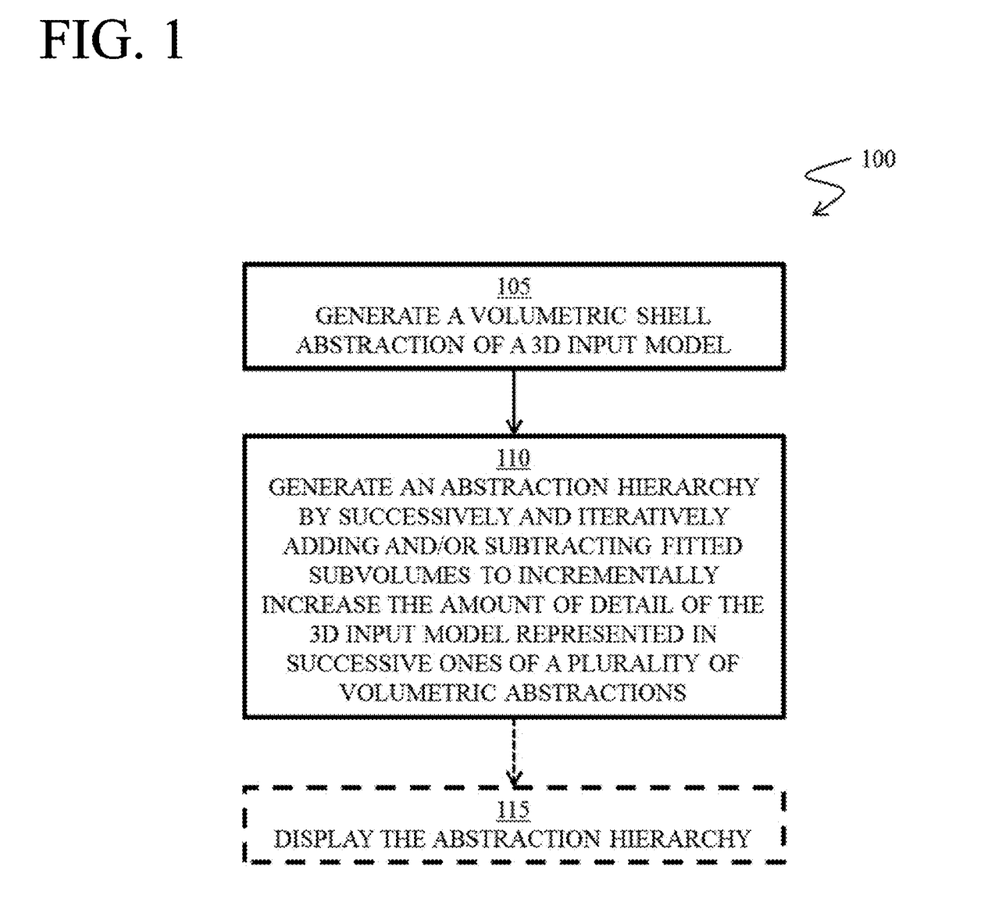
FIG. 1 is a flow diagram illustrating an exemplary method of generating an abstraction hierarchy of volumetric abstractions based on a 3D input model.
Figure 5:
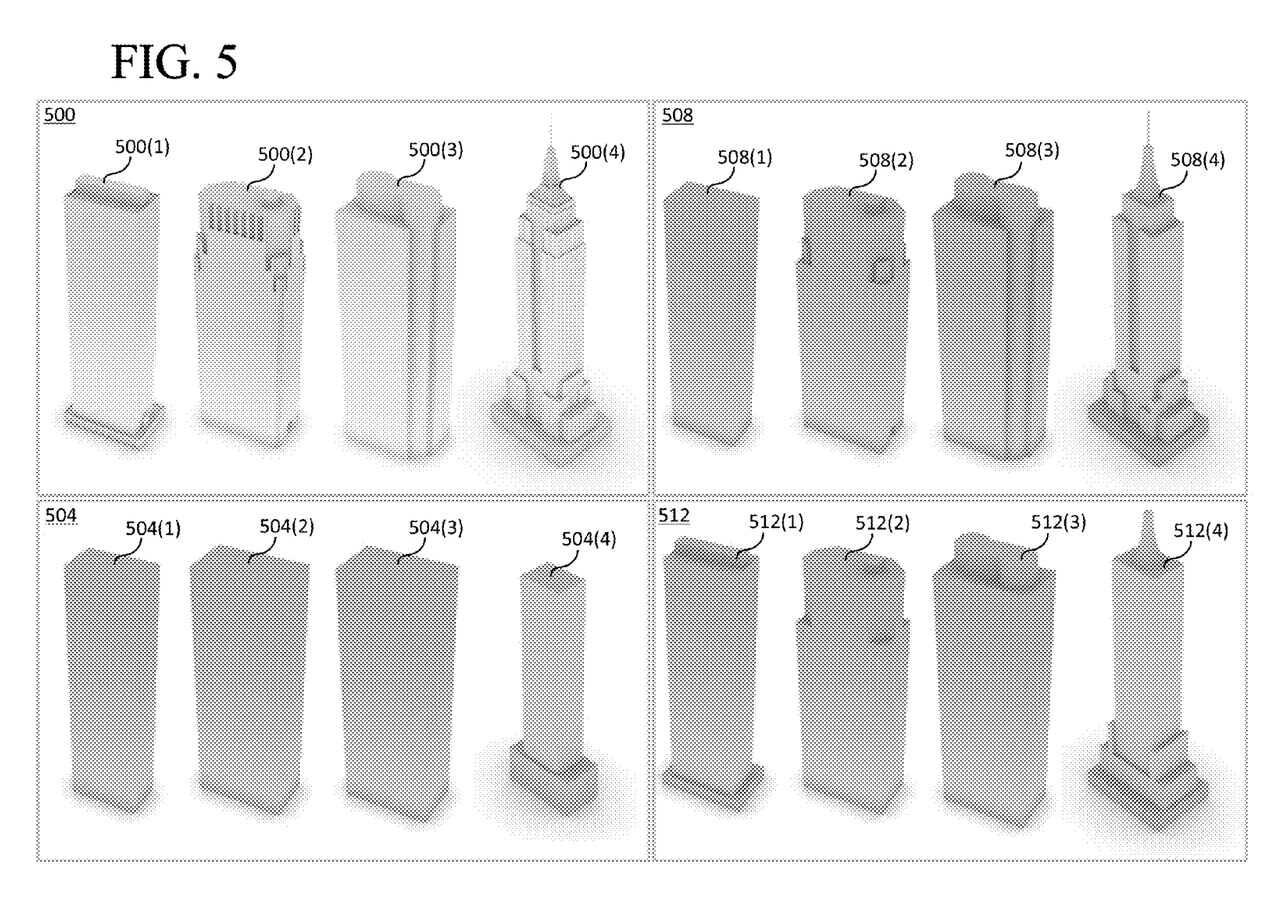
FIG. 5 is a diagram illustrating co-abstraction results for four co-abstracted 3D input models using three enthalpy minimization approaches.

Referring now to the drawings, FIG. 1 illustrates a high-level method 100 of creating an abstraction hierarchy that includes a number of volumetric abstractions of a 3D input model. For the sake of illustration, FIG. 2 shows an exemplary 3D input model 200 and a hierarchy 204 of five volumetric abstractions 204(1) to 204(5), with volumetric abstraction 204(1) being the most abstracted (i.e., coarsest and showing the least amount of detail of the 3D input model) and volumetric abstraction 204(5) being the least abstracted (i.e., finest and showing the most amount of detail of the 3D input model) in the hierarchy. In this example, volumetric abstraction 204(1) is an initial volumetric shell abstraction of 3D input model 200. An exemplary representative computing system capable of performing method 100 is illustrated in FIG. 5. It is also noted that method 100 may be embodied in volumetric abstraction software (also see FIG. 5 and accompanying description) and performed by a suitable computing system and/or network of computing systems. When such software is executed by one or more computing system, the resulting system effectively becomes a volumetric abstraction system. Those of ordinary skill in the art will readily understand how to create and code software for performing method 100 using the present disclosure as a guide. In addition, those skilled in the art will also readily understand how to execute such software on one or more computing systems, regardless of whether a single computing system is used or multiple computing systems are used across a network, such as the Internet. For the sake of simplicity, since method 100 and other methods disclosed herein will typically be performed on digital computers, the terms "digital," digitally," and like terms are used herein and in the appended claims to denote that the corresponding steps are performed on one or more digital computers and that the corresponding elements are created, modified, or otherwise manipulated by one or more digital computers.

Referring to both FIG. 1 for steps of method 100 and FIG. 2 for accompanying exemplary illustrations, at step 105 the volumetric abstraction system digitally generates a volumetric shell abstraction of a 3D input model, in the example of FIG. 2, volumetric abstraction 204(1) of 3D input model 200. The 3D input model includes volumetric detail elements, such as perceived surfaces and character lines and contours, that provide the 3D input model with detail and distinctive visual character. As an example and referring to FIG. 2, volumetric detail elements of 3D input model 200 include recess 208 in lower front bumper 212, a step-back 214 of the front bumper to grill region 216, contouring 220 on side door 224, voids 228 in wheels 232, recesses 236 at windows 240, and side-view mirrors 244(1) and 244(2), among others. Generally, geometric detail elements of a 3D input model can be viewed as any volumetric elements that provide detail to the highest-level (coarsest) abstraction, here, volumetric abstraction 204(1), which is also the volumetric shell abstraction that the volumetric abstraction system digitally generates at step 105. The volumetric abstraction system may generate an initial volumetric shell abstraction in any suitable manner, such as in the manner described below.

At step 110, the volumetric abstraction system digitally generates an abstraction hierarchy by successively digitally modifying the volumetric shell abstraction by successively and iteratively adding and/or subtracting fitted subvolumes to incrementally increase the amount of detail of the 3D input model represented in successive ones of a plurality of volumetric abstractions. In FIG. 2, this step is illustrated by volumetric abstractions 204(2) to 204(5) that include increasing numbers of represented volumetric detail elements through the progression. For example, comparing volumetric abstraction 204(2) with volumetric abstraction 204(1) (the initial volumetric shell abstraction), a first pass at adding/subtracting fitted subvolumes results in volumetric abstraction 204(2) having a bumper crease 248 (subtractive process) and a partially defined front wheel-tire assembly 252 (additive process). In a second, successive iteration of increasing detail, the volumetric abstraction system digitally generates volumetric abstraction 204(3), which includes an enhanced bumper crease 248A (subtractive process) and a partially defined rear wheel-tire assembly 256 (additive process), by adding or subtracting corresponding respective fitted subvolumes. The successive iterations continue in the example until the volumetric abstraction system digitally generates volumetric abstraction 204(5), which has the largest amount of detail of the five volumetric abstractions 204(1) to 204(5) in abstraction hierarchy 204.

It is noted that each successive iteration at increasing the level of geometric detail expressed in any particular volumetric abstraction can be tailored to suit any particular desire and/or need. For example, the adding/subtracting of fitted subvolumes can be lesser, such as by adding/subtracting a single fitted subvolume during an iteration, or greater, such as by adding/subtracting multiple fitted subvolumes during an interation. As described below, locations on a coarser volumetric abstraction for adding/subtracting a fitted subvolume may be determined by comparing the coarser volumetric abstraction to the 3D input model to essentially determine sizes of fitted subvolume that need to be added or subtracted. Using such information, the volumetric abstraction system can determine where to add a particular fitted subvolume, such as by starting with the largest volumetric detail element of the 3D model missing in the current volumetric abstraction and working successively down to the smallest missing volumetric detail. In addition and as those skilled in the art will understand, by bracketing size ranges, the volumetric abstraction system can determine how many fitted-subvolume additions/subtractions to make in a particular interation.

At optional step 115, the volumetric abstraction system may display the abstraction hierarchy to a user on a suitable display. Such display may be performed in any suitable manner, such as by displaying the entire set (hierarchy) of volumetric abstractions at one time or displaying each of the volumetric abstractions one at a time, among other options. Regardless of the manner of display selected, those skilled in the art will readily understand how to enable such displaying, for example, using techniques known for CAD systems.

Figure 3:
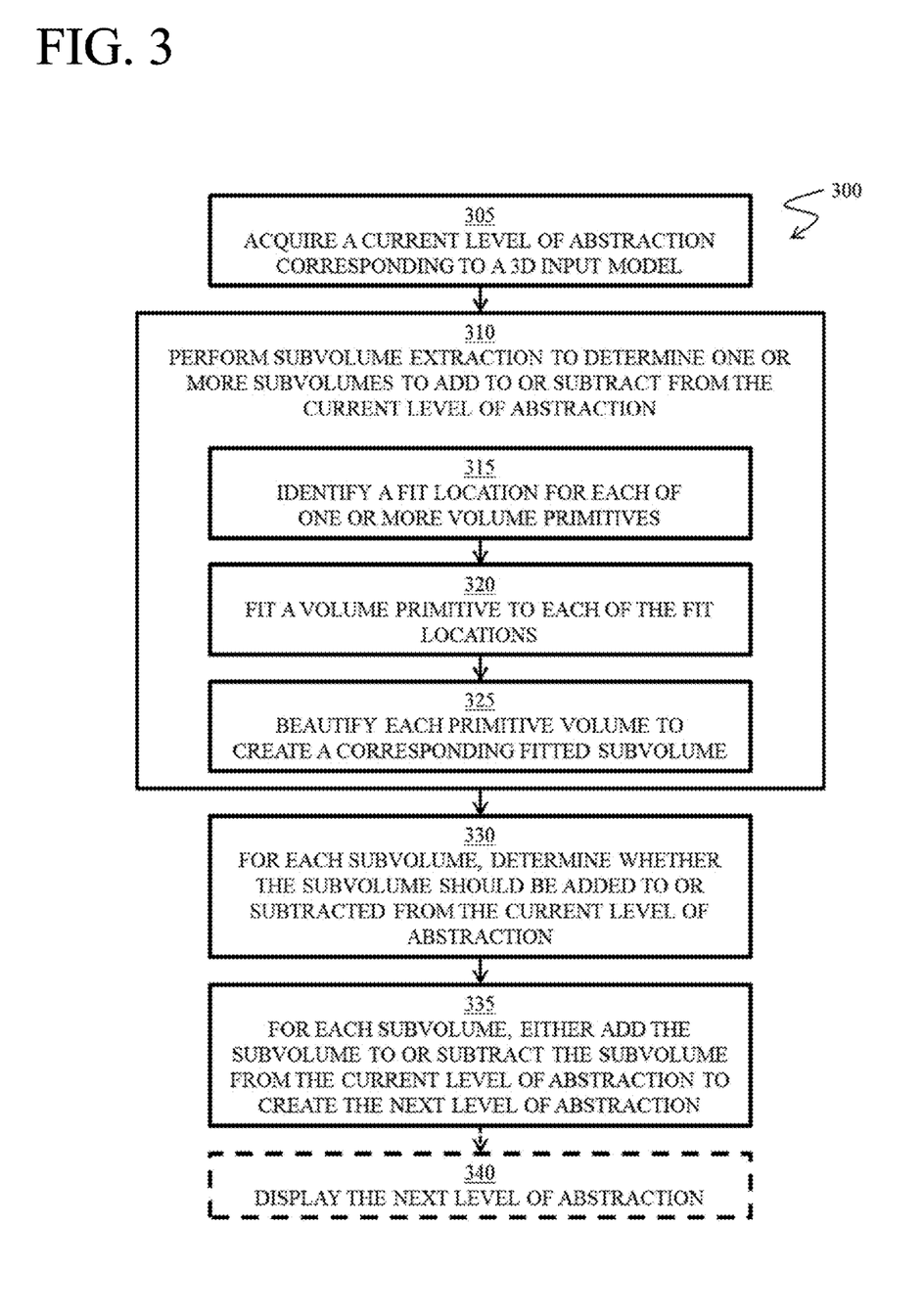
FIG. 3 is a flow diagram illustrating a method of generating a volumetric abstraction from a 3D input model.
Figure 4:
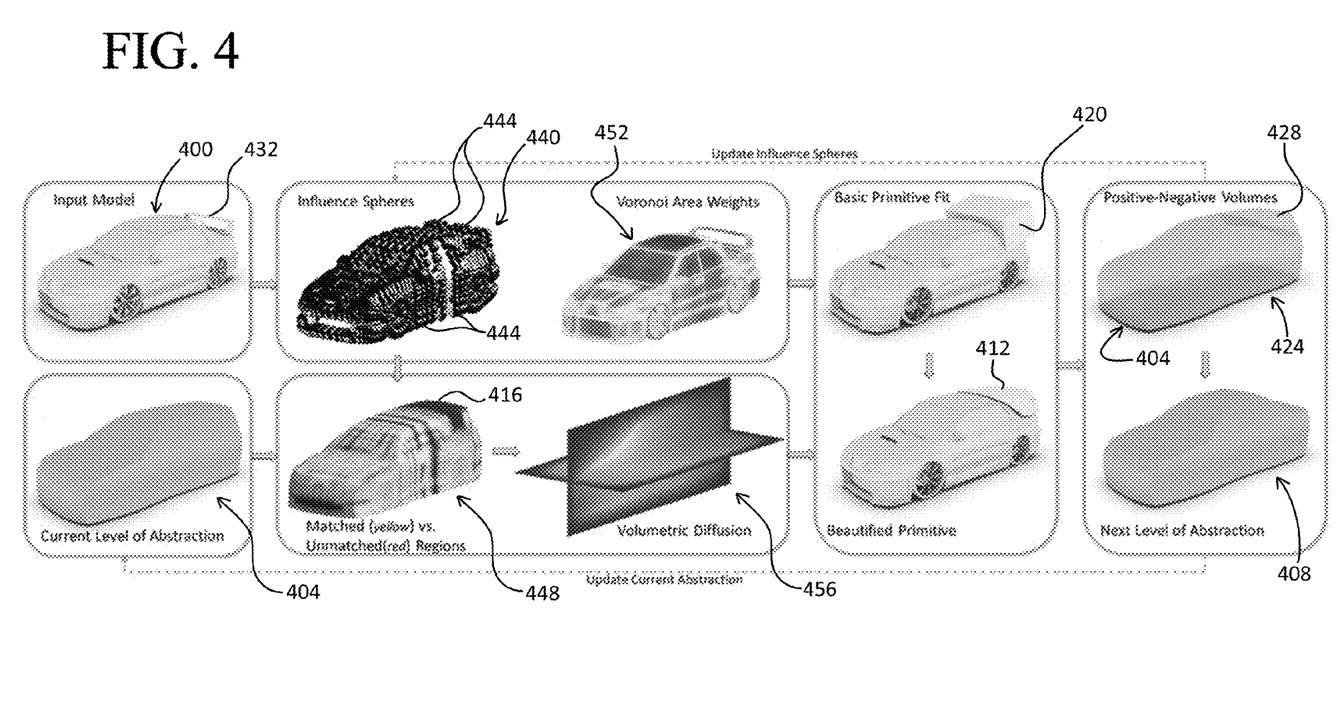
FIG. 4 is a diagram illustrating various steps of the method of FIG. 3 and representing exemplary algorithms that can be used to implement the method of FIG. 3.

As described above, step 110 of method 100 involves successively digitally modifying the volumetric shell abstraction by iteratively adding and/or subtracting fitted subvolumes to incrementally increase, within volumetric abstractions, the amount and/or extent of representation of the volumetric detail elements of the 3D input model. FIGS. 3 and 4 illustrate, respectively, an exemplary method 300 and corresponding specific exemplary process, of incrementally increasing the volumetric detail elements represented in volumetric abstractions that can be used at step 110 of method 100 or may be used independently of method 100. In this example, and as shown in FIG. 4, method 300 of FIG. 3 utilizes a full-detail 3D input model 400 and a current level of volumetric abstraction 404 to arrive at a next level of volumetric abstraction 408, which is essentially an output of method 300. As noted above, current level of volumetric abstraction 404 may also be called a "coarser volumetric abstraction" and next level of volumetric abstraction 408 may be called "a finer volumetric abstraction" because a result of performing method 300 is to add one or more representations of one or more volumetric detail elements of the 3D input model to the current level of volumetric abstraction to achieve the next, or more detailed, level of volumetric abstraction. Various steps of method 300 are directed to operations that a volumetric abstraction system may perform to achieve a next level of abstraction. Method 300 is described in the context of FIG. 4 for convenience of illustration, explanation, and exemplification. Those skilled in the art will readily appreciate, however, that the particular model and corresponding volumetric abstractions illustrated in FIG. 4 are merely exemplary and non-limiting. For example, as mentioned above, there is virtually no limitation on the nature and character of appropriate subject matter of the 3D input model. In addition, the various graphical representations of results of various algorithms are provided for visualization to enhance the reader's understanding, and, likewise, these should not be interpreted as being limiting in any way.

Referring now to FIG. 3, and also to FIG. 4, at step 305 of method 300 the volumetric abstraction system generates, receives, or otherwise acquires a current level of abstraction, for example current level of abstraction 404 of FIG. 4. If method 300 is performed iteratively, such as in conjunction with abstraction hierarchy generating method 100 of FIG. 1, current level of abstraction 404 may initially be the starting volumetric shell abstraction noted above, such as volumetric shell abstraction 204(1) of FIG. 2. If so, next level of abstraction 408 of FIG. 4 may be volumetric abstraction 204(2) of FIG. 2. On the next iteration for further refinement, current level of abstraction 404 can be volumetric abstraction 204(2) of FIG. 2, and next level of abstraction 408 can be volumetric abstraction 204(3) of FIG. 2. The same pattern would continue until volumetric abstraction 204(5) is the last next level of abstraction 408 of FIG. 4.

At step 310, volumetric abstraction system performs subvolume extraction to identify one or more subvolumes, such as subvolume 412 of FIG. 4, to be added to or subtracted from current level of abstraction 404. In one embodiment, the volumetric abstraction system may identify each subvolume by a multi-step process of identifying a fit location (step 315), such as fit location 416 on the current level of abstraction 404, fitting a volumetric primitive, such as volumetric primitive 420, to the fit location (step 320), and geometrically beautifying the volume primitive to create a geometrically beautified volume primitive, which is also the fitted subvolume (step 325), such as fitted subvolume 412 in the example of FIG. 4. At step 330, the volume abstraction system determines whether each fitted subvolume should be added to or subtracted from the current level of abstraction, and at step 335, for each fitted subvolume the volume abstraction system either 1) adds the fitted subvolume to the current level of abstraction or 2) subtracts the fitted subvolume from the current level of abstraction to achieve the next level of abstraction, depending on the result at step 330. In the illustrative example shown in FIG. 4, fitted subvolume 412 is a subtractive volume that needs to be removed from current level of abstraction 404, as illustrated in sub-diagram 424 of FIG. 4, which shows the region 428 within current level of abstraction 404 corresponding to fitted subvolume 412. Once the volumetric abstraction system subtracts region 428, i.e., subtracts fitted subvolume 412, from current level of abstraction 404, the result is the next level of abstraction 408. At optional step 340, the volumetric abstraction system may display the resulting next level of abstraction, i.e., the finer volumetric abstraction, on a display.

Although not illustrated in FIG. 4, a next iteration through steps 305 to 335 of method 300 may determine that the rear wing 432 of 3D input model 400 is the next volumetric detail element that should be addressed relative to next level of abstraction 408. As those skilled in the art will readily appreciate, in this scenario, the volumetric abstraction system would perform method 300 again, but this time using next level of abstraction 408 as the current level of abstraction at step 305, and the method would add a geometrically beautified subvolume (not shown) representing rear wing 432 of 3D input model 400. As noted above in connection with method 100 of FIG. 1, the volumetric abstraction system may successively iteratively perform steps 305 to 335 of method 300 of FIG. 3 to create increasingly finer volumetric abstractions by continually using the generated next level of abstraction as the starting current level of abstraction. Following are some exemplary algorithms that can be used to perform various steps of method 300.

Exemplary Algorithms for Performing Volumetric Abstraction

Performing subvolume extraction at step 310 of method 300 may begin with a basic primitive fit using the 3D input model, such as 3D input model 400 of FIG. 4, and the current level of abstraction geometry, such as current level of abstraction 404. In this example primitive fitting is based on robust statistics like those used in random sample consensus (RANSAC) methods, wherein candidates are generated and scored. However, the present method uses volumetric primitives, such as rectangular prisms, triangular prisms, cylinders, and truncated cones, among others, compared to surface primitives and uses a different scoring mechanism.

During the abstraction process, every vertex in the 3D input model maintains a parent subvolume it belongs to (initially, a bounding box of the 3D input model). For each vertex, this association defines a sphere of influence with radius $R_i = \gamma D_p$, wherein $D_p$ is the bounding box diagonal of the subvolume, and $\gamma$ is a user-defined scale ratio. FIG. 4 illustrates an influence sphere diagram 440 showing such influence spheres 444 (only a few are labeled for convenience) applied to 3D input model 400. As alluded to above, current level of abstraction 404 may consist of all the beautified and possibly blended subvolumes extracted until the current iteration. Surfaces of the abstraction geometry are then segmented into clusters of matched and unmatched sub-regions. In the example of FIG. 4, these matched and unmatched subregions are represented by, respectively, the unshaded and shaded regions of diagram 448. A region on the abstraction geometry is classified as matched if it falls inside one or more of the influence spheres, and unmatched otherwise.

To assign normalized weights to the model vertices on a subsequent subvolume extraction, the volumetric abstraction system may calculate an impact factor to each vertex for the original 3D input model, M, as follows:

$$P_i = A_i T_i \bigg/ \sum_{j \in M} A_j T_j \qquad (1)$$

wherein: $P_i$ is the impact factor associated with the $i^{th}$ vertex and $A_i$ is the corresponding Voronoi area. In the example of FIG. 4 Veronoi area weights are represented in diagram 452. $T_i \in [0, 1]$ is the diffusion weight associated with vertex i. $T_i$ is determined as the result of a volumetric diffusion process using the matched (unshaded, T=0) and unmatched (shaded, T=1) regions of the current abstraction geometry as Dirichlet boundary conditions. This is represented in diagram 448 in the example of FIG. 4. The steady state values of T inside the bounding box volume are computed by solving a second order partial differential equation (diffusion equation) using Dirichlet boundary conditions. However in the present example, the solution for the exact diffusion on a voxelated grid is performed using a multi-grid solver. Diagram 456 of FIG. 4 visually represents this. $T_i$ for each vertex of the 3D input model is then determined from the resulting diffusion map with quadratic interpolation based on the 3D grid vertices. At the end, a high impact factor $P_i$ allows the contribution of the $i^{th}$ vertex to be greater in the subsequent candidate generation and scoring steps.

As noted, basic volumetric primitives in this example include rectangular prisms, triangular prisms, cylinders, and truncated cones. The volumetric abstraction system constructs a number of these basic primitives using the vertices of the 3D input model, building the candidate pool. For each primitive type, the necessary number of vertices to construct it are drawn probabilistically using the impact factors in Equation 1 as the probability density function (Note that Equation 1 is utilized as a probability distribution, with $A_iT_i$ representing the random variable. This interpretation is facilitated by the fact that: $\forall i \; 0 \leq A_iT_i \leq 1$, and $\Sigma A_i \; T_i=1$). Rectangular prisms, for example, require four vertices to be drawn. The first vertex forms one base corner. The second vertex forms the height of the prism, and together with the first vertex leads to a vector. A base plane is formed such that it passes through the first vertex and uses this vector as its normal. The third and fourth vertices are projected to this plane, creating two vectors starting at the first vertex and ending at these projections. These two vectors are next orthogonalized to create the base rectangle, and therefore the full prism obtains the identified height. Triangular prisms follow the same procedure, except the base vectors are not orthogonalized. For the generation of a cylinder we use the height and base radius forming the two orthogonal vectors at the base. For the generation of a truncated cone, we add a top radius to the base radius and height, resulting in three vectors.

In each step, the newly fit primitives are required to intersect the geometry of the current level of abstraction; non-intersecting candidates are released from the pool. This ensures that inner primitives are merged with the outer volumes when possible, and that all abstractions represent single closed volumes of arbitrary genus (hence preventing islands of solids). In this example, the volumetric abstraction system assigns a score, Sp, to each candidate as follows:

$$Sp = (A_{sp}/A_p) \sum_{i \in M} P_i \alpha_i \qquad (2)$$

wherein $A_p$ is the total surface area of the basic primitive and $A_{sp}$ is the portion of $A_p$ that falls within the spheres of influence defined by the original vertices. The volumetric abstraction system approximates the intersection area by the intersection between the sphere and an intermediate polygonal discretization of the primitive under consideration. $\alpha_i$ is a decay function defined within each sphere of influence as follows:

$$\alpha_i = e^{-(d_i/R_i)^2} - e^{-1} \text{ if } d_i \leq R_i, \; 0 \text{ otherwise} \qquad (3)$$

wherein $d_i$ is the minimum distance from the $i^{th}$ vertex to the primitive surface. This scoring scheme favors primitives whose surfaces fall within the spheres of influence. Likewise, $P_i$ draws the selection toward primitives that claim currently unclaimed volumes, and lastly $\alpha_i$ further favors the primitives whose surfaces are proximate to the sphere centers.

Once the volumetric abstraction system selects a candidate volumetric primitive having the highest score in Equation 2, the system geometrically beautifies the faces of the primitive into polynomial surfaces to match the original model. In the example of FIG. 4, rectangular prismatic volumetric primitive 420 is the highest scoring volumetric primitive, and fitted subvolume 412 is the resulting geometrically beautified version of this primitive. For the geometric beautification process, the volumetric abstraction system gathers the vertices whose influence spheres intersect the basic primitive faces, and those that fall inside the primitive volumes. The volumetric abstraction system then assigns each vertex to the nearest primitive face forming a distinct vertex cluster $\Psi_f$ (e.g., for a rectangular prism, up to six such clusters are obtained).

For a given $\Psi_f$, the volumetric abstraction system replaces the associated primitive face with a polynomial surface. In one example, the volumetric abstraction system attempts to identify the most suitable fit ranging from linear to quartic (or higher order, as desired) surfaces. Starting from a linear surface hypothesis, a subset of the vertices in $\Psi_f$ are randomly drawn, and applies an $l^2$-norm least-squares regression. The volumetric abstraction system may repeat this process many times, resulting in a set of linear surface candidates. Out of these candidates, the volumetric abstraction system chooses the one that minimizes the following exponential-error function as the best planar surface fit to $\Psi_f$:

$$E^S = \sum_{v \in \Psi_f} 1 - \frac{1}{e^{d(v,S)}} \qquad (4)$$

$$S^* = \underset{S}{\mathrm{argmin}} E^S$$

wherein $E^S$ is the error associated with the surface hypothesis S, d(v, S) is the $l^1$-norm between v and S, and S* is the best-fit surface.

In the present example, the volumetric abstraction system repeats the same process with higher degree surfaces. If the improvement in the exponential-error between the current and next-degree fit is less than 10%, the volumetric abstraction system keeps the lower degree surface as the beautified representation of the primitive face. Generating many surface candidates and minimizing Equation 4 allow the resulting surface to desirably snap to a subset of the vertices in $\Psi_f$. In effect, the selection is biased toward surfaces closely approximating a subset of the vertices, rather than a potentially looser approximation of the entire set.

After volumetric abstraction system extracts a subvolume, the system decides whether the subvolume should be additive or subtractive using two scores, a union score and a difference score. In one example, the union score is $S_u = \Sigma_{i \in M_{out}} P_i \alpha_i$, wherein $M_{out}$ are the points of M that are outside the previous abstraction geometry and $P_i$ and $\alpha_i$ are given by Equations 1 and 3, respectively. The union score is high when the subvolume is in the vicinity of high impact factor vertices in $M_{out}$. Also in the example, the difference score is $S_d = \Sigma_{i \in M_{in}} P_i \alpha_i$, wherein $M_{in}$ are the points of M that are inside the current abstraction geometry. If $S_u \geq S_d$ the interpretation of the subvolume is additive, and is subtractive otherwise.

After the volumetric abstraction system constructs the subvolume, the system adds its surfaces to a surface graph, which encodes topological neighborhood information of all the beautified surfaces the volumetric abstraction system has generated so far. However, the newly added surfaces may remain geometrically disparate. In some embodiments, the volumetric abstraction system further seeks to infuse the new surfaces into the existing abstraction using surface blending and merging techniques. In one example for blending, the volumetric abstraction system determines if a natural continuity across candidate surfaces exists using the vertices the surfaces claim at that instance. If detected, the volumetric abstraction system uses a partition of unity on the implicit representations to blend the surfaces. The volumetric abstraction system applies surface merging when the edges of two neighboring surfaces are in close proximity and thus can be reduced to one. In addition, the volumetric abstraction system may remove surface regions that partially or fully remain inside the resulting abstraction. With the new abstraction geometry in place, the volumetric abstraction system revisits all vertices to determine those to be proximate to the current surfaces using the influence spheres. The volumetric abstraction system relinquishes for use by subsequent subvolumes all vertices whose influence spheres do not intersect the current abstraction shell.

The above representation has several advantages, such as a small memory footprint, trivial trimmed surface calculation, rendering without tessellation, and polygonal tessellation at arbitrary resolution when needed.

Note that a single iteration of steps 305 to 335 of method 300 of FIG. 3 leads to the next level of abstraction in a spectrum (i.e., hierarchy) given the previous coarser level of abstraction. However, for the initial abstraction, i.e., for the initial volumetric shell abstraction, and in one example, the for volumetric abstraction system performs this iteration multiple times until at least 75% of all the original vertices have been visited at least once by a basic primitive. This allows the starting abstraction to be a meaningful representation of the original model.

As mentioned above, in some embodiments, a volume abstraction system of the present disclosure can be designed and configured to perform co-abstraction on multiple 3D input models. Given a collection of 3D input models, such a volumetric abstraction system can compute an abstraction hierarchy for each 3D input model in a manner described above. A goal of co-abstraction is to identify an appropriate abstraction level for each 3D input model such that all 3D input models in the collection are abstracted out to the highest extent possible, while preserving their shape identities as well as the perceived level of detail in the collection as a whole. In one example, the present inventors have formulated this as an entropy-minimization problem of a model collection, C, wherein the total entropy of the collection ($H^t$) consists of (1) individual ($H^n$), (2) relative ($H^r$) and (3) mutual ($H^m$) entropies:

$$H^t = w_n \cdot \frac{1}{k} \sum_{i \in C} H_i^n + w_r \cdot \frac{1}{k^2/2} \sum_{i,j \in C} H_{ij}^r + w_m \cdot \frac{1}{k^2/2} \sum_{i,j \in C} H_{ij}^m \quad (5)$$

wherein k=size(C) and i≠j.

For a given model, the individual entropy ($H^n$) is minimum for the most abstract form, and increases monotonically until reaching a maximum for the original geometry. Starting from the most abstract form, this term measures the added detail in each level, in relation to the volume that is added or subtracted. To this end, the volumetric abstraction system first uniformly scales all models in C such that each has a bounding box volume of one. With each abstraction level, the individual entropy for that particular model increases by $-\log|V_{bp}|$, wherein $V_{bp}$ is the normalized volume of the subvolume added or subtracted in that level. Note that with this formulation, small details have a tendency to increase the entropy significantly. The individual entropy of a model at abstraction level a is then defined as:

$$H_a^n = H_{a-1}^n - \log|V_{bp}| \quad (6)$$

For models exhibiting symmetry, each abstraction level may introduce more than one subvolume. In such cases, the entropy contribution at that level is computed as the sum of the subvolume group's entropy.

Relative entropy ($H^r$) works to keep the abstracted shapes geometrically as distinct as possible so as to preserve their identities. In the context of shape similarity, this translates into positioning each object farthest from all other objects in a shape signature space. To measure shape similarity and in one example, the volumetric abstraction system utilizes a two-dimensional angle-distance (AD) histogram, which is calculated from the pairwise euclidean distances and the inner products of the surface normals at randomly selected points over the model. In this example, to generate the AD histogram, the volumetric abstraction system uses $2048^2$ randomly generated points on the 3D input model and maps the results to a 128(distance)×32(angle) quantization of the histogram. The volumetric abstraction system then defines the relative entropy between abstractions $a_i$ and $a_j$, with shape histograms $h^{a_i}$ and $h^{a_j}$, respectively, as:

$$H_{a_i,a_j}^r = \frac{1}{\sum_{x=1}^{128} \sqrt{\sum_{y=1}^{32} (h^{a_i}(x,y) - h^{a_j}(x,y))^2}} \quad (7)$$

Another technique, such as a pairwise distance (D2) histogram technique or a shape diameter (SD) histogram technique, may be used. However, so far the AD technique has provided the best compromise between accuracy and computation time. Note that the co-abstraction framework disclosed herein can be similarly used with other shape signatures.

While relative entropy preserves geometric differences, mutual entropy ($H^m$) aims to maintain a consistent abstraction level for the models in C. As such, for a pair of models, it works to make their abstraction levels similar, regardless of whether the models are highly abstracted or detailed. This helps establish a perceived uniformity for co-abstraction in which the resulting abstractions all seem to share a similar level of detail. For two abstractions $a_i$ and $a_j$, with individual entropies $H_{a_i}^n$ and $H_{a_j}^n$ respectively, the mutual entropy is then defined as:

$$H_{a_i,a_j}^m = \|H_{a_i}^n - H_{a_j}^n\| \quad (8)$$

After the volumetric abstraction system calculates the abstraction hierarchy of each model in C, the system can calculate the individual entropy, $H^n$, and the shape signature, AD, for each abstraction of each of the models. A goal in this step is to determine the optimum abstraction for each model such that Equation 5 is minimized. In one example, the volumetric abstraction system uses genetic optimization wherein a solution vector $O=q_i, \ldots, q_k$ is defined with q, representing a real number in the range [0.0, 1.0], and k is the number of models in the collection. The volumetric abstraction system may compute a fitness of such a solution in three steps: (1) transform each $q_i$ (1≤i≤k) to an integer between [1, . . . , $N_i$], where $N_i$ is the number of distinct models computed in the abstraction spectra of the $i^{th}$ model. For this, we use a linear mapping function that maps the range [0.0, 1.0] to [1, . . . , $N_i$]; (2) use the entries of the new integer vector as the current abstraction levels for the models in the collection; and (3) compute the total entropy, hence the fitness of the solution vector O using Equation 5. In one example, starting from an initial population of 60 randomly generated such solution vectors (hence individuals), the volumetric abstraction system uses genetic optimization to minimize Equation 5. In each generation, the volumetric abstraction system maintains a population of 60 individuals with 2-individual elitism and applies a one-point crossover with 5% mutation rate. Note that the volumetric abstraction system applies the crossover and mutation operations rather straightforwardly, thanks to a common [0.0, 1.0] range vectors shared by all potential solutions. Prior to optimization, the volumetric abstraction system performs a range-normalization for each of the three entropy terms so as to make the contributions of the individual entropies congruent. The weights $w_n$, $w_r$, $w_m$ in the objective function can be chosen separately for biasing when necessary (a current implementation uses equal weights).

Referring now to FIG. 5, quadrant 500 shows four 3D input models 500(1) to 500(4) co-abstracted using differing entropy terms. Quadrant 504 shows the resulting corresponding respective volumetric abstractions 504(1) to 504(4) when the volumetric abstraction system uses only individual entropy terms in Equation 5. As shown, this expectedly produces the most abstract form for each 3D input model. Quadrant 508 shows the resulting corresponding respective volumetric abstractions 508(1) to 508(4) when the volumetric abstraction system uses only relative entropies. This results in some of volumetric abstractions 508(1) to 508(4) remaining too detailed compared to other ones of these volumetric abstractions, which adversely affects the abstraction level consistency in the collection in an effort to maximize identity preservation. Here, the relative entropies that emphasize shape dissimilarity forces one of the volumetric abstractions 508(1) to 508(4), i.e., volumetric abstraction 508(1) to its most abstract form, while others, especially volumetric abstractions 508(3) and 508(4), remain more complex. Quadrant 512 shows the resulting corresponding respective volumetric abstractions 512(1) to 512(4) when the volumetric abstraction system uses all three terms in Equation 5, which strike a desirable balance between these individual forces.

As noted above, any one or more of the aspects and embodiments described herein may be conveniently implemented using one or more machines (e.g., one or more computing devices that are utilized as a user computing device, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
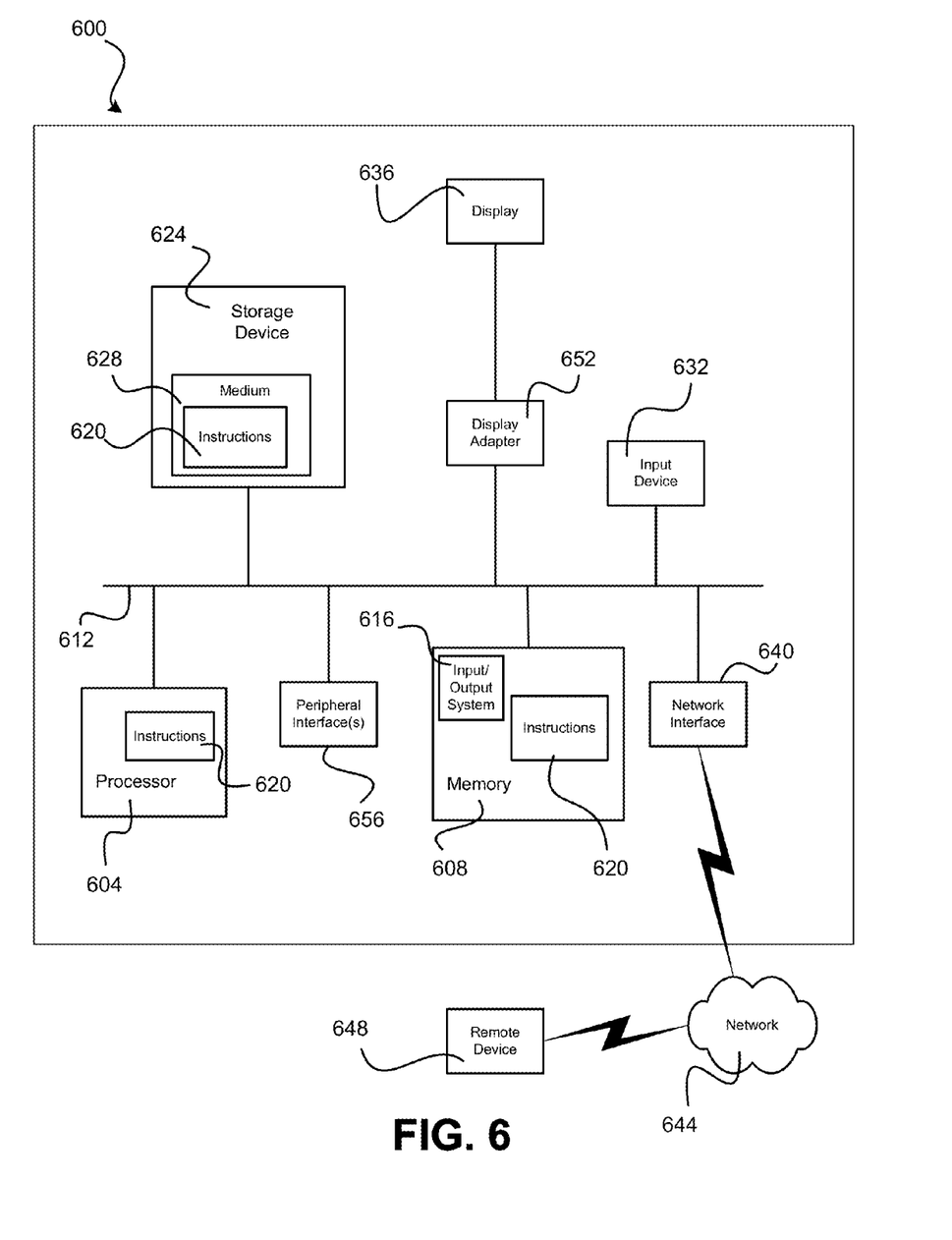
FIG. 6 is a high-level diagram of a computing system that can be used in performing any one or more of the methods disclosed herein.

FIG. 6 shows a diagrammatic representation of one embodiment of a computing device in the exemplary form of a computer system 600 within which a set of instructions is executed for causing a volumetric abstraction system to perform any one or more of the aspects and/or methodologies of the present disclosure, such as methods 100 and 300 of FIGS. 1 and 3, respectively. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Memory 608 may include various components (e.g., machine readable media) including, but not limited to, a random access memory component, a read only component, and any combinations thereof. In one example, a basic input/output system (BIOS) 616, including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 662 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 662 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 666. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of generating a finer volumetric abstraction for viewing by a human viewer, the finer volumetric abstraction corresponding to a digital three-dimensional (3D) input model, the method comprising:
   digitally acquiring a coarser volumetric abstraction corresponding to the digital 3D input model;
   digitally performing subvolume extraction to determine one or more subvolumes to add to or subtract from the coarser volumetric abstraction;
   for each subvolume of the one or more subvolumes:
      digitally determining, as a function of the digital 3D input model, whether to 1) add the subvolume to the coarser volumetric abstraction or 2) subtract the subvolume from the coarser volumetric abstraction; and
      depending on said digitally determining, either 1) digitally adding the subvolume to the coarser volumetric abstraction or 2) digitally subtracting the subvolume from the coarser volumetric abstraction in generating the finer volumetric abstraction;
   outputting the finer volumetric abstraction for viewing by the human viewer;
   wherein:
      said digitally performing subvolume extraction includes, for each subvolume of the one or more subvolumes:
         digitally fitting a volume primitive to the coarser volumetric abstraction; and
         digitally geometrically beautifying the volume primitive as a function of the digital 3D input model to create the subvolume; and the coarser volumetric abstraction includes surfaces and the method further comprises segmenting the surfaces into clusters of matched or unmatched subregions as a function of the digital 3D input model; and determining where on the coarser volumetric abstraction to fit the volume primitive as a function of said segmenting.

2. A method of generating a finer volumetric abstraction for viewing by a human viewer, the finer volumetric abstraction corresponding to a digital three-dimensional (3D) input model, the method comprising:

digitally acquiring a coarser volumetric abstraction corresponding to the digital 3D input model;

digitally performing subvolume extraction to determine one or more subvolumes to add to or subtract from the coarser volumetric abstraction;

for each subvolume of the one or more subvolumes:
digitally determining, as a function of the digital 3D input model, whether to 1) add the subvolume to the coarser volumetric abstraction or 2) subtract the subvolume from the coarser volumetric abstraction; and depending on said digitally determining, either 1) digitally adding the subvolume to the coarser volumetric abstraction or 2) digitally subtracting the subvolume from the coarser volumetric abstraction in generating the finer volumetric abstraction; and outputting the finer volumetric abstraction for viewing by the human viewer;

wherein:
said digitally performing subvolume extraction includes, for each subvolume of the one or more subvolumes:
digitally fitting a volume primitive to the coarser volumetric abstraction; and
digitally geometrically beautifying the volume primitive as a function of the digital 3D input model to create the subvolume; and
the coarser volumetric abstraction includes surfaces and the method further comprises segmenting the surfaces into clusters of matched or unmatched subregions as a function of the digital 3D input model; and
the digital 3D input model includes vertices and the method further comprises building a candidate pool of volume primitives based on the vertices.

3. A method according to claim 2, wherein the candidate pool includes rectangular prisms, triangular prisms, and cylinders.

4. A method according to claim 2, wherein said digitally fitting includes digitally fitting by random scoring of the volume primitives in the candidate pool.

5. A method of generating a finer volumetric abstraction for viewing by a human viewer, the finer volumetric abstraction corresponding to a digital three-dimensional (3D) input model, the method comprising:

digitally acquiring a coarser volumetric abstraction corresponding to the digital 3D input model;

digitally performing subvolume extraction to determine one or more subvolumes to add to or subtract from the coarser volumetric abstraction;

for each subvolume of the one or more subvolumes:
digitally determining, as a function of the digital 3D input model, whether to 1) add the subvolume to the coarser volumetric abstraction or 2) subtract the subvolume from the coarser volumetric abstraction; and depending on said digitally determining, either 1) digitally adding the subvolume to the coarser volumetric abstraction or 2) digitally subtracting the subvolume from the coarser volumetric abstraction in generating the finer volumetric abstraction;

outputting the finer volumetric abstraction for viewing by the human viewer;

wherein:
said digitally performing subvolume extraction includes, for each subvolume of the one or more subvolumes:
digitally fitting a volume primitive to the coarser volumetric abstraction; and
digitally geometrically beautifying the volume primitive as a function of the digital 3D input model to create the subvolume; and
the coarser volumetric abstraction includes surfaces and the method further comprises segmenting the surfaces into clusters of matched or unmatched subregions as a function of the digital 3D input model; and calculating diffusion weights based on said segmenting.

6. A method according to claim 5, further comprising determining where on coarser volumetric abstraction to fit the volume primitive based on the diffusion weights.

7. A machine-readable storage medium containing machine-executable instructions for performing a method of generating a finer volumetric abstraction for viewing by a human viewer, the finer volumetric abstraction corresponding to a digital three-dimensional (3D) input model, said machine-executable instructions comprising:

a first set of machine-executable instructions for digitally acquiring a coarser volumetric abstraction corresponding to the digital 3D input model;

a second set of machine-executable instructions for digitally performing subvolume extraction to determine one or more subvolumes to add to or subtract from the coarser volumetric abstraction;

a third set of machine-executable instructions for, for each subvolume of the one or more subvolumes:
digitally determining, as a function of the digital 3D input model, whether to 1) add the subvolume to the coarser volumetric abstraction or 2) subtract the subvolume from the coarser volumetric abstraction; and depending on said digitally determining, either 1) digitally adding the subvolume to the coarser volumetric abstraction or 2) digitally subtracting the subvolume from the coarser volumetric abstraction in generating the finer volumetric abstraction;

a fourth set of machine-executable instructions for outputting the finer volumetric abstraction for viewing by the human viewer;

wherein:
said second set of machine-executable instructions includes machine-executable instructions for, for each subvolume of the one or more subvolumes:
digitally fitting a volume primitive to the coarser volumetric abstraction; and
digitally geometrically beautifying the volume primitive as a function of the digital 3D input model to create the subvolume; and
the coarser volumetric abstraction includes surfaces and the machine-readable storage medium further comprises a fifth set of machine-executable instructions for segmenting the surfaces into clusters of matched or unmatched subregions as a function of the digital 3D input model; and a sixth set of machine-executable instructions for determining where on the coarser volumetric abstraction to fit the volume primitive as a function of said segmenting.

8. A machine-readable storage medium containing machine-executable instructions for performing a method of generating a finer volumetric abstraction for viewing by a human viewer, the finer volumetric abstraction corresponding to a digital three-dimensional (3D) input model, said machine-executable instructions comprising:

a first set of machine-executable instructions for digitally acquiring a coarser volumetric abstraction corresponding to the digital 3D input model;

a second set of machine-executable instructions for digitally performing subvolume extraction to determine one or more subvolumes to add to or subtract from the coarser volumetric abstraction;

a third set of machine-executable instructions for, for each subvolume of the one or more subvolumes:

digitally determining, as a function of the digital 3D input model, whether to 1) add the subvolume to the coarser volumetric abstraction or 2) subtract the subvolume from the coarser volumetric abstraction; and depending on said digitally determining, either 1) digitally adding the subvolume to the coarser volumetric abstraction or 2) digitally subtracting the subvolume from the coarser volumetric abstraction in generating the finer volumetric abstraction; and a fourth set of machine-executable instructions for outputting the finer volumetric abstraction for viewing by the human viewer;

wherein:

said second set of machine-executable instructions includes machine-executable instructions for, for each subvolume of the one or more subvolumes:

digitally fitting a volume primitive to the coarser volumetric abstraction; and digitally geometrically beautifying the volume primitive as a function of the digital 3D input model to create the subvolume;

the coarser volumetric abstraction includes surfaces and the machine-readable storage medium further comprises a fifth set of machine-executable instructions for segmenting the surfaces into clusters of matched or unmatched subregions as a function of the digital 3D input model; and the digital 3D input model includes vertices and the machine-readable storage medium further comprises a sixth set of machine-executable instructions for building a candidate pool of volume primitives based on the vertices.

9. A machine-readable storage medium according to claim 8, wherein the candidate pool includes rectangular prisms, triangular prisms, and cylinders.

10. A machine-readable storage medium according to claim 8, wherein said machine-executable instructions for digitally fitting includes machine-executable instructions for digitally fitting by random scoring of the volume primitives in the candidate pool.

11. A machine-readable storage medium containing machine-executable instructions for performing a method of generating a finer volumetric abstraction for viewing by a human viewer, the finer volumetric abstraction corresponding to a digital three-dimensional (3D) input model, said machine-executable instructions comprising:

a first set of machine-executable instructions for digitally acquiring a coarser volumetric abstraction corresponding to the digital 3D input model;

a second set of machine-executable instructions for digitally performing subvolume extraction to determine one or more subvolumes to add to or subtract from the coarser volumetric abstraction;

a third set of machine-executable instructions for, for each subvolume of the one or more subvolumes:

digitally determining, as a function of the digital 3D input model, whether to 1) add the subvolume to the coarser volumetric abstraction or 2) subtract the subvolume from the coarser volumetric abstraction; and depending on said digitally determining, either 1) digitally adding the subvolume to the coarser volumetric abstraction or 2) digitally subtracting the subvolume from the coarser volumetric abstraction in generating the finer volumetric abstraction;

a fourth set of machine-executable instructions for outputting the finer volumetric abstraction for viewing by the human viewer;

wherein:

said second set of machine-executable instructions includes machine-executable instructions for, for each subvolume of the one or more subvolumes:

digitally fitting a volume primitive to the coarser volumetric abstraction; and digitally geometrically beautifying the volume primitive as a function of the digital 3D input model to create the subvolume; and the coarser volumetric abstraction includes surfaces and the machine-readable storage medium further comprises a fifth set of machine-executable instructions for segmenting the surfaces into clusters of matched or unmatched subregions as a function of the digital 3D input model; and a sixth set of machine-executable instructions for calculating diffusion weights based on said segmenting.

12. A machine-readable storage medium according to claim 11, further comprising a seventh set of machine-executable instructions for determining where on coarser volumetric abstraction to fit the volume primitive based on the diffusion weights.

13. A machine-readable storage medium containing machine-executable instructions for performing a method of creating an abstraction hierarchy for viewing by a human viewer, the abstraction hierarchy comprising a plurality of digital volumetric abstractions of a three-dimensional (3D) input model having geometric detail, said machine-executable instructions comprising:

a first set of machine-executable instructions for digitally generating a volumetric shell abstraction of the 3D input model;

a second set of machine-executable instructions for digitally generating the abstraction hierarchy by successively and iteratively digitally modifying the volumetric shell abstraction using fitted subvolumes to incrementally increase the geometric detail of the 3D input model represented in successive ones of the plurality of volumetric abstractions;

a third set of machine-executable instructions for outputting the abstraction hierarchy for viewing by the human viewer;

wherein:
said second set of machine-executable instructions for successively and iteratively digitally modifying the volumetric shell abstraction includes machine-executable instructions for, for each successive one of the plurality of volumetric abstractions:
digitally acquiring a coarser volumetric abstraction corresponding to the digital 3D input model;
digitally performing subvolume extraction to determine one or more subvolumes to add to or subtract from the coarser volumetric abstraction; and
for each subvolume of the one or more subvolumes:
digitally determining, as a function of the digital 3D input model, whether to 1) add the subvolume to the coarser volumetric abstraction or 2) subtract the subvolume from the coarser volumetric abstraction; and
depending on said digitally determining, either 1) digitally adding the subvolume to the coarser volumetric abstraction or 2) digitally subtracting the subvolume from the coarser volumetric abstraction in generating the finer volumetric abstraction;
said machine-executable instructions for digitally performing subvolume extraction includes machine-executable instructions for, for each subvolume of the one or more subvolumes:
digitally fitting a volume primitive to the coarser volumetric abstraction; and
digitally geometrically beautifying the volume primitive as a function of the digital 3D input model to create the subvolume; and
the coarser volumetric abstraction includes surfaces and the machine-readable storage medium further comprises machine-executable instructions for segmenting the surfaces into clusters of matched or unmatched subregions as a function of the digital 3D input model; and
a fifth set of machine-executable instructions for digitally determining a most-suitable abstraction level within each of the abstraction hierarchy and the at least one other abstraction hierarchy.

14. A machine-readable storage medium according to claim 13, wherein said fifth set of machine-executable instructions include machine-executable instructions for minimizing a joint entropy computed from inter-model and intra-model geometric relationships.

\* \* \* \* \*